United States Patent Office 2,908,862
Patented Oct. 13, 1959

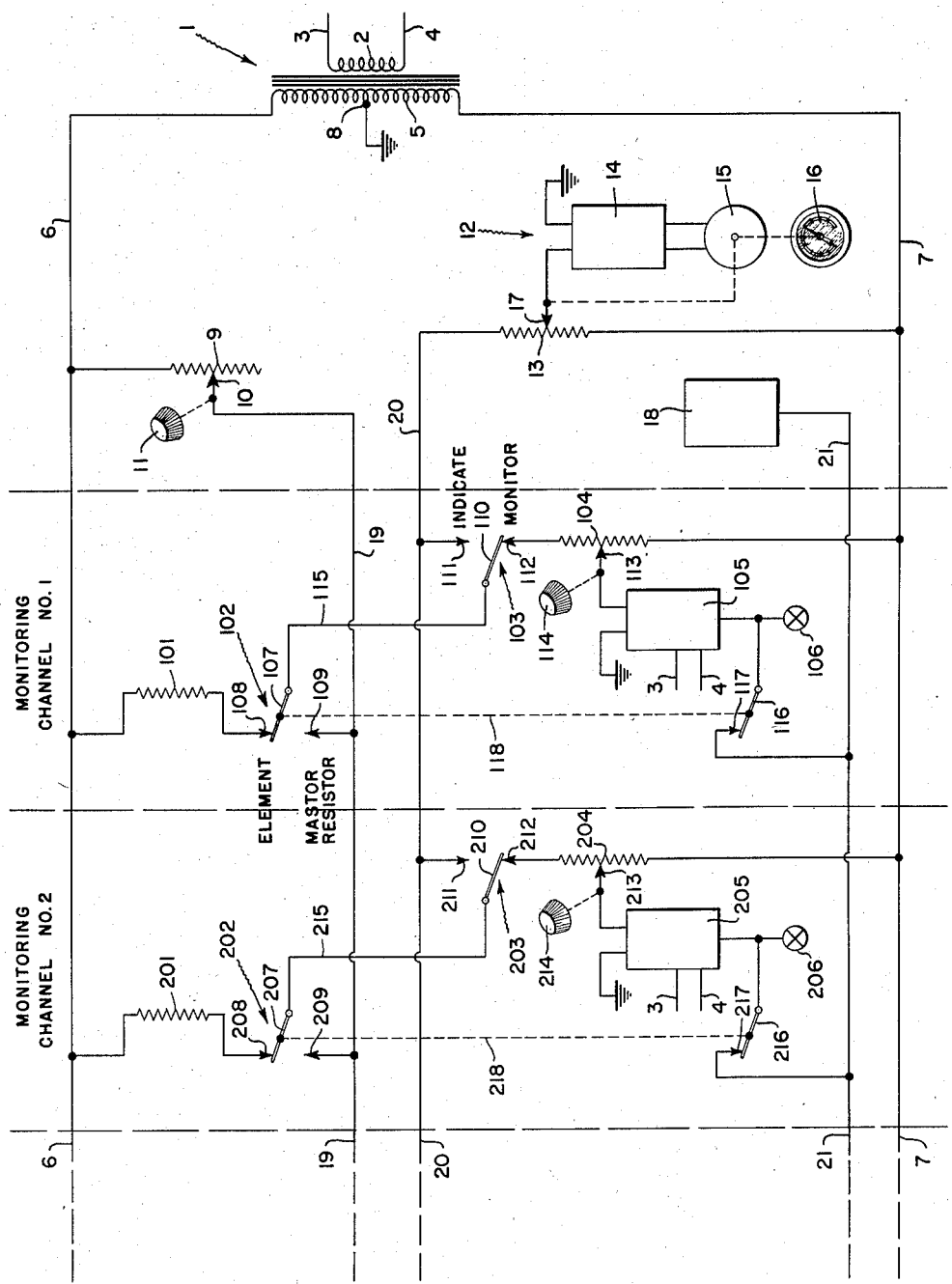

2,908,862
MEASURING APPARATUS

Thomas A. Patchell, Havertown, Pa., assignor to Minneapolis-Honeywell Regulator Company, Minneapolis, Minn., a corporation of Delaware Application May 26, 1955, Serial No. 511,365

15 Claims. (Cl. 324—62)

The present invention relates generally to apparatus for measuring the values of conditions, and relates particularly to apparatus for monitoring the values of one or more conditions. More specifically, the invention relates to an improved monitoring arrangement for the values of one or more conditions or characteristics including novel means for setting the set points regularly employed in such arrangements.

A general object of the present invention is to provide novel measuring apparatus adapted to monitor the values of one or more conditions or characteristics. A specific object of the invention is to provide improved apparatus of this type including novel means for permitting the accurate adjustment of the values of the set points provided in such apparatus.

A more specific object of the invention is to provide novel monitoring apparatus of the type just specified including improved set point adjusting or setting means which permit the accurate setting of the set point or points of the apparatus with a minimum of components, and with a minimum of interconnecting and switching of these components.

In monitoring apparatus for the values of one or more conditions, it is customary to provide means for permitting the accurate establishment and setting of the points, commonly called the set points, which represent the selected maximum or minimum values which the monitored conditions can obtain without causing the apparatus to produce its signalling or other operation. The inclusion of such set point establishing and adjusting means in monitoring apparatus permits the latter to produce its warning signal or other predetermined effect whenever the value of any of the monitored conditions departs in a predetermined direction from the desired, selected set point value for that condition.

Various forms of such set point producing and adjusting means have been suggested in the past for use in condition monitoring apparatus. However, the known arrangements which have heretofore been suggested or provided for permitting or facilitating the set point setting in such apparatus have usually included a plurality of expensive, accurately calibrated devices and/or been unduly complex. Thus, there has existed a need for relatively simple and inexpensive means for set point establishment and adjustment, especially in apparatus for monitoring a plurality of conditions having a different set point value for each condition.

For example, in a forty channel electrical temperature monitoring device, it is usually not economically practical to follow the previously known procedures and provide forty precision calibrated adjustable resistors to be used as the set point adjusting devices, or to provide the complex interconnecting and switching arrangements needed when selected ones of a group of precision resistors are to be employed in setting the set points of the channels.

Accordingly, it is a prime object of the present invention to provide improved condition monitoring apparatus which includes set point establishing and adjusting means of relatively simple and inexpensive form which provide for the accurate setting of the set points in a simple manner and without the need for an excessive number of expensive, precision components, without the use of excessively complex interconnecting and switching arrangements, and without requiring the use of any external standards, calibrating devices, or precision equipment.

A more specific object of the invention is to provide such improved apparatus wherein the set point setting or adjusting means for the monitored channel or channels comprise simple, uncalibrated devices whose accurate and proper adjustment is permitted and facilitated by the use of a single uncalibrated, adjustable master setting component of simple form cooperating with simple switching means and a single measuring means of the type usually included in monitoring apparatus for providing measurements of the actual monitored values when desired.

In accordance with the present invention, the novel set point establishing and adjusting means thereof, together with the novel means for facilitating the accurate adjustment or setting of the set point devices, include a separate, adjustable set point device which is individually associated with each of the elements or channels the values of whose conditions or characteristics are to be monitored. In the preferred embodiment of the invention illustrated herein by way of example, the resistances of a plurality of resistance thermometer elements, respectfully representative of a plurality of temperatures, are the characteristics or conditions whose values are monitored. Further, the adjustable set point devices of the illustrated embodiment are adjustable resistors, there being one of these resistors associated individually with each of the element channels to be monitored.

Each of the elements is normally connected with the associated one of the set point devices in comparative relation to detecting means which are operative to produce a predetermined effect, and to actuate a signal device, whenever the actual value of any of the monitored characteristics differs in a given direction from the selected, set point value for that characteristic to which the corresponding set point device has been adjusted. Moreover, each of the elements is connectible individually to measuring means included in the apparatus so as to obtain direct measures of the actual values of each of the element characteristics.

To permit the accurate adjustment of each of the set point devices to the proper selected value for the corresponding element, there is provided a single adjustable component, shown in the illustrated embodiment of the invention as an adjustable master resistor, which is connectible to the input of the measureing means to permit the adjustment of the component to a value corresponding to the desired set point value of any one of the set point devices which is to be set. Once the master component is so adjusted, it is switched to the corresponding channel to be connected to the detecting means in lieu of the corresponding element and in comparative relation with the corresponding set point device. The latter is then adjusted accurately to a value corresponding to the desired set point value by means of the operation of the detector. Thereafter, the master component is removed from the monitoring channel, and is available for use in setting the set point devices of any of the other channels.

When the master resistor is removed from the channel whose set point has just been set, the element of that channel is again connected in comparative relation with the adjusted set point device to the input of the detector, whereafter any departure of the value of that element from the set point value in the predetermined direction causes the detector to actuate the signalling means to indicate the occurrence of the abnormal value.

The various features of novelty which characterize the invention are pointed out with particularity in the claims annexed hereto and forming a part of the specification. For a better understanding of the invention, its advantages, and the specific objects attained with its use, reference should be had to the accompanying drawing and descriptive matter in which there is illustrated and described a preferred embodiment of the invention.

The single figure of the drawing, which illustrates a preferred embodiment of the present invention, is a diagrammatic representation of a multi-channel monitoring means which embodies the novel set point establishing and adjusting means of the invention, and which monitors the electrical resistance values and temperatures of a plurality of resistance thermometer elements.

The apparatus disclosed and described herein as illustrative of the improved monitoring apparatus of the present invention includes a plurality of monitoring channels, one for each element the value of the characteristic or condition of which is to be monitored. For simplicity, only two of such channels are shown in detail in the drawing, but it is to be understood that the apparatus could include as many more of such channels as desired, such additional channels being connected to the conductors extending off to the left in the drawing in the same manner as the illustrated channels are connected to those conductors.

In each channel, the element whose actual value is monitored is shown as being a resistance thermometer element. Thus, the value monitored in each channel is the actual value of the resistance of the corresponding resistance thermometer element, and hence is effectively the actual value of the temperature to which that element is exposed.

In describing the monitoring channels of the apparatus, it will be necessary to refer in detail to only one of these channels, since each channel is the exact duplicate of the other. Therefore, in the following description, only the channel labelled Monitoring Channel No. 1 will be described in detail, it being understood that the same description applies as well to the other illustrated channel, labelled Monitoring Channel No. 2, and to the aforementioned additional channels. For convenience, each of the reference characters for the components included in Channel No. 1 is preceded by the digit 1, while the elements of Channel No. 2 bear reference characters which are identical to those of the corresponding components of the first channel except for being preceded by the digit 2 instead of the digit 1.

Channel No. 1 includes a resistance thermometer element 101, element switching means 102, selector switching means 103, an adjustable set point resistor 104, a detector 105, and a signal lamp 106. The switching means 102 includes a movable member 107 which, when in its upper or "Element" position, engages solely a stationary contact 108. When in its lower or "Master Resistor" position, the member 107 engages solely a stationary contact 109.

The switching means 103 includes a movable contact member 110 which, when in its upper or "Indicate" position, engages solely a stationary contact 111. When the member 110 is in its lower or "Monitor" position, it engages solely a stationary contact 112.

The adjustable set point resistor 104 includes a contact 113 which is adjustable along the body of the resistor 104 by means of a suitable set point adjusting knob 114.

In addition to the plurality of monitoring channels, the disclosed apparatus includes energizing means in the form of a transformer 1 having a primary winding 2 which is adapted to be connected between alternating energizing voltage supply conductors 3 and 4. The transformer 1 also has a secondary winding 5 which supplies alternating energizing voltage directly to the apparatus. To this end, the upper end terminal of the winding 5 is connected to a supply conductor 6 which extends throughout the apparatus as shown, while the lower end terminal of the winding 5 is connected to a supply conductor 7 which also extends throughout the apparatus. A tap connection 8 on the winding 5 is connected to the frame or ground of the apparatus, and is thus a common connection to a plurality of other points in the apparatus as shown by the conventional ground symbols.

Also included in the apparatus is a single master setting component comprising an adjustable master resistor 9 having a contact 10 which is adjustable along the body of the resistor 9 by means of a suitable adjusting knob 11. Additionally, the apparatus includes measuring means 12 which is shown as being a self-balancing device of conventional form including an adjustable rebalancing resistor 13, an amplifying and motor driving device 14, a rebalancing motor 15, and indicating means 16. The resistor 13 includes a contact 17 which is adjusted along the body of the resistor 13 by means of the motor 15 under the control of the device 14 as necessary to maintain the measuring means in balance and to position the indicator 16 in accordance with the value of any resistor suitably connected in circuit with the resistor 13, as will be more fully described hereinafter.

The apparatus further includes a signalling or alarm device 18 which is arranged to be energized to produce a suitable type of alarm signal whenever the temperature of any of the elements increases above the corresponding, selected set point value for which the associated set point resistor has been set and thus causes the corresponding detector to produce a predetermined effect.

In Channel No. 1, the element 101 is connected between the supply conductor 6 and the switch contact 108, while the switch member 107 is connected by a conductor 115 to the switch member 110. Also, the switch contact 112 is connected to the upper end terminal of the set point resistor 104, the lower end terminal of which is connected to the supply conductor 7. Accordingly, when the switch member 107 is in the "Element" position, and the switch member 110 is simultaneously in the "Monitor" position, as in shown in the drawing, the element 101 is connected in series with the resistor 104 between the supply conductors 6 and 7.

The contact 113 of the resistor 104 is connected to one of the input terminals of the detector 105, the other input terminal of which is connected to the tap 8 on the secondary winding 5 by means of the common ground connection as shown. Accordingly, when the switch members 107 and 110 are in the positions just described, the actual value of the resistance of the element 101 is effectively connected to the input of the detector 105 in comparative relation with the resistance value of the resistor 104 between the contact 113 and the conductor 7 as determined by the adjusted position of the contact 113.

The switch contact 109 is connected to a conductor 19 which extends throughout the apparatus and is connected at its right-hand end to the adjustable contact 10 of the master resistor 9. The upper and only connected end terminal of that resistor is connected to the supply conductor 6.

The switch contact 111 is connected to a conductor 20 which extends throughout the apparatus and is connected at its right-hand end to the upper end terminal of the rebalancing resistor 13 of the measuring means 12. The lower end terminal of the resistor 13 is connected to the supply conductor 7, while the adjustable contact 17 of this resistor is connected to one of the input terminals of the device 14. The remaining input terminal of the latter is connected to the secondary winding tap 8 through the common ground connection as shown.

The output of the detector 105 is directly connected to the signal lamp 106, and is connected to a conductor 21 through switch members 116 and 117 included in the element switching means 102. The member 116 is operated in synchronism with the member 107 through a linkage 118 so that the output of the detector 105 is connected to the conductor 21 whenever the switch member 107 is in the "Element position," while the detector output is disconnected from the conductor 21 whenever the switch member 107 is in the "Master Resistor" position. The conductor 21 extends throughout the apparatus and is connected at its right-hand end to the signalling device 18 for a purpose to be discussed hereinafter. This signalling portion of the apparatus has been shown in single line form in order to prevent the drawing from being unduly complicated.

As is clear from the drawing, the various components of Channel No. 2 are connected between the several conductors 6, 7, 19, 20, and 21 in the same manner as are the corresponding described components of the first monitoring channel. Likewise, any other monitoring channels, not shown, will have their components connected between the several conductors in the same manner as shown for the two illustrated channels.

In the normal or monitoring operation or condition of Channel No. 1 of the apparatus, the switch members 107 and 110 occupy the positions shown in the drawing, and the element 101, the resistor 104, and the detector 105 are connected in a monitoring circuit. In this circuit, the detector 105 effectively compares the actual resistance value of the element 101 with the set point or adjusted value of the set point resistor 104 between the contact 113 and the conductor 7. Therefore, the detector effectively compares the actual value of the temperature of the element 101 with the selected set point temperature value represented by and corresponding to the resistance value to which the set point resistor contact 113 has been set, and hence monitors the element resistance and temperature.

To this end, the detector 105 is arranged to be operative to produce a predetermined effect and to actuate the devices 18 and 106 whenever the actual value of the element 101 departs in a predetermined direction from the set point value determined by the position of the set point resistor contact 113. Assuming that the element 101 has a negative temperature coefficient of resistance, and assuming that it is desired to have the apparatus produce its signalling effect upon an increase in any of the element temperatures above the corresponding set point value, the detector 105 will be assumed to be arranged to actuate the devices 18 and 106 whenever the actual resistance value of the element 101 decreases below the set point value established therefor.

For accomplishing this operation, it will be seen that the aforementioned monitoring circuit, including the element 101, the resistor 104, and the detector 105, is effectively a form of bridge circuit which is completed by the supply conductors 6 and 7 and the transformer secondary winding 5. This bridge circuit can be traced from the upper end terminal of the winding 5, through the conductor 6, the element 101, the switch contacts 108 and 107, the conductor 115, the switch contacts 110 and 112, the resistor 104, and the conductor 7 back to the lower end terminal of the winding 5.

This bridge circuit is energized with alternating voltage from the conductors 6 and 7, and produces an alternating voltage output between the set point contact 113 and the transformer winding tap 5. When the resistance of the element 101 and the setting of the contact 113 are such that the total resistance between the conductor 6 and the contact 113 is greater than the resistance between the contact 113 and the conductor 7, the bridge circuit produces an output of a given phase relative to the phase of the supply voltage between the conductors 3 and 4. Similarly, when the resistance between the conductor 6 and the contact 113 is smaller than that between the contact 113 and the conductor 7, the bridge circuit produces an output which is 180° out of phase with the first mentioned bridge circuit output and with the supply voltage of conductors 3 and 4. Thus, this opposite phase output is produced whenever the resistance of the element 101 falls below the set point value therefor, and hence is produced whenever the temperature of the element 101 exceeds the set point value thereof. Accordingly, the detector 105 is arranged to produce its predetermined effect of actuating the devices 18 and 106 whenever a bridge output of said opposite phase is produced and applied to the detector input from between the contact 113 and the tap 8, but does not produce said effect when in the presence of a bridge circuit output of said given phase.

To this end, the detector 105 may well be of any of the many forms of phase sensitive detectors well known in the art, and may well be of the type disclosed and claimed in my copending application Serial No. 450,191, which was filed on August 16, 1954.

To permit the detector 105 to respond to said opposite phase bridge circuit output, but not to said given phase output, the detector 105 is supplied with voltage of the supply voltage phase by the supply conductors 3 and 4 as shown.

To summarize the foregoing operation, the detector 105 does not produce its predetermined effect to operatively energize the devices 18 and 106 as long as the actual resistance value of the element 101 is above the selected set point value to which the contact 113 has been set and hence causes the monitoring bridge circuit output to have said given phase representing an actual value for the temperature of the element 101 which is below the selected set point value therefor. Whenever the actual value of the temperature of the element 101 increases above the selected set point value to which the contact 113 has been set, thereby causing the actual resistance value of the element 101 to decrease below the set point value established by the position of the contact 113, the bridge circuit produces said opposite phase output which is applied to the input of the detector 105, and which causes the latter to produce its predetermined effect and energize the devices 18 and 106.

The apparatus of the invention is also operative to provide a direct measurement of the actual temperature value of any of the resistance thermometer elements of the apparatus whenever a knowledge of such a temperature is necessary or desirable. To this end, the apparatus is arranged to permit the actual resistance value of any of the resistance thermometer elements to be directly measured by means of the measuring means 12.

Specifically, when the actual temperature and resistance values of the element 101 are to be measured, the switch member 110 occupies the "Indicate" position, wherein it engages the switch contact 111 and thus connects the element 101 to the measuring means 12 instead of to the detector 105. The switch member 107 occupies the "Element" position as before. In this measuring operation or condition of the apparatus, the element 101 is effectively connected with the rebalancing resistor 13 in a self-balancing measuring bridge circuit which can be traced from the upper end terminal of the winding 5, through the conductor 6, the element 101, the switch contacts 108 and 107, the conductor 115, the switch contacts 110 and 111, the conductor 20, the resistor 13, and the conductor 7 back to the lower end terminal of the winding 5. This measuring bridge circuit is energized from the supply conductors 6 and 7, and produces its output between the contact 17 of the resistor 13 and the tap 8 on the winding 5. Since the input portion of the amplifying and motor controlling device 14 is connected between the contact 17 and the tap 8, any output produced by the measuring bridge circuit is applied to the input of the device 14. Also, the output of the latter is connected to the rebalancing motor 15, whereby the presence of any measuring bridge circuit output is effective to cause the device 14 to energize the motor 15 for rotation in the direction and to the extent necessary to reposition the contact 17 so as to reduce the bridge circuit output to zero and hence balance the circuit.

Accordingly, when the actual temperature of the element 101 is being measured, the device 14 controls the motor 15 so that the latter positions the contact 17 as necessary to balance the measuring bridge circuit. When the bridge circuit is balanced, the position of the contact 17 represents the actual resistance value, and hence the actual temperature value, of the element 101, and this value appears on the indicator 16, which is positioned simultaneously with the contact 17.

It is desirable to provide the foregoing means for permitting the measurement of the actual values of the temperatures of the resistance thermometer elements, since it is often desirable to be able to ascertain the actual temperature of one of the elements following the actuation of the signalling and alarm devices by that element. Also, it has been found to be desirable in practice to be able to ascertain the actual element temperatures under various other situations.

As was noted previously hereinbefore, the position of the set point resistor contact 113 along the body of the resistor 104 determines the set point value of the apparatus for the No. 1 channel. Therefore, this position must be accurately determined, and the contact 113 must be accurately set, if the apparatus signalling and alarm devices are to be actuated whenever the temperature of the element 101 increases above the exact, selected set point value. That is, the accuracy with which the apparatus performs its monitoring function and produces its signalling effect is dependent upon the accuracy with which the set point contact 113 is set with respect to the exact temperature value above which the signalling effect is to be produced.

Since it is usually essential that the temperature below which such apparatus does not produce its signalling effect but above which it does produce this effect have a very specific value, it is essential that monitoring apparatus of the type being described be provided with means by which the set point devices can be easily adjusted accurately to the desired set point values so that the proper operation of the apparatus will take place upon any increases in the monitored temperatures above the corresponding desired, selected set point temperatures. The problem is to correlate the positions of the set point resistor contacts with the actual temperature values of the corresponding elements at which the apparatus signalling effects will be produced.

The novel means provided in the disclosed apparatus according to the present invention for permitting the contacts of the set point resistors to be accurately set in accordance with the exact values of the elements at which the apparatus is to produce its signalling function will now be described.

When the set point contact 113 is to be positioned or adjusted so that the No. 1 channel will cause the actuation of the signalling devices 18 and 106 whenever the temperature of the element 101 increases above a particular specific set point value, such as 200° F., for example, the switch member 107 occupies the lower or "Master Resistor" position, and the switch member 110 simultaneously occupies the upper or "Indicate" position. In this master resistor setting condition of the apparatus, the switch member 107 engages the contact 109 and the switch member 110 engages the contact 111, with the result that the master resistor 9 is connected to the measuring means 12 for the measurement by the latter of the adjusted resistance value of the resistor 9. This master resistor setting circuit can be traced from the upper end terminal of the winding 5, through the conductor 6, the resistor 9, the conductor 19, the switch contacts 109 and 107, the conductor 115, the switch contacts 110 and 111, the conductor 20, the resistor 13, and the conductor 7 back to the lower end terminal of the winding 5. It can be seen that the circuit just traced is a self-balancing bridge circuit which is like the measuring bridge circuit previously described, but which differs therefrom by including the master resistor 9 in lieu of any of the resistance thermometer elements.

When the apparatus is in the condition just described, the effective or adjusted value of the resistance of the resistor 9 is measured by the means 12, in the same manner as the latter measures the actual resistance value of the element 101 in the measuring operation of the apparatus previously described. Accordingly, adjustments given to the contact 10 of the resistor 9 are accompanied by equivalent adjustments of the indicator 16 of the measuring means, whereby the indication provided by the latter is an accurate measure of the adjusted position of the contact 10 and the adjusted resistance value of the resistor 9.

It should be noted that the adjusted resistance value of the resistor 9 which causes the measuring means 12 to provide an indication on the indicator 16 of a certain specific temperature value is the same resistance value which the element 101, and each of the other resistance thermometer elements of the apparatus, would have if it were at a temperature equal to said certain indicated temperature. Accordingly, by rotating the knob 11 and adjusting the contact 10 along the body of the resistor 9 until the indicator 16 indicates the specific, selected set point temperature value of 200° F. at which Channel No. 1 is to be set, the adjusted resistance value of the adjustable master resistor 9 is made to correspond to, or be equal to, the resistance value which the element 101 would have if the value of its temperature were equal to the desired set point value of 200° F. as set on the indicator 16.

Once the adjustable master resistor 9 has been adjusted to a resistance value corresponding to the selected set point value as measured by the measuring means 12, the adjusted master resistor 9 is effective to permit the set point contact 113 to be properly and accurately adjusted to the desired set point value. For this to be done, the switch member 110 occupies the lower or "Monitor" position in which it engages the switch contact 112, while the switch member 107 remains in engagement with the switch contact 109. This establishes a set point setting condition and bridge circuit in the apparatus, this circuit including the master resistor 9, the set point resistor 104, and the detector 105 connected in the same manner as the monitoring bridge circuit previously described except that the present circuit includes the master resistor 9 in lieu of the element 101.

The set point setting circuit can be traced from the upper end terminal of the winding 5, through the conductor 6, the resistor 9, the conductor 19, the switch contacts 109 and 107, the conductor 115, the switch contacts 110 and 112, the resistor 104, and the conductor 7 back to the lower end terminal of the winding 5. In this condition of the apparatus, the adjusted master resistor 9 replaces the element 101 in the monitoring circuit, and hence permits the ready adjustment of the set point contact 113 to a position corresponding to the adjusted value of the resistor 9 and hence to the selected set point value of 200° F. for the temperature of the element 101. The proper adjustment of the contact 113 is effected by turning the knob 114 to adjust the contact 113 along the body of the resistor 104 until the previously inoperative detector 105 just produces its predetermined effect. This signalling by the detector 105 indicates that the contact 113 has been brought into the proper position corresponding to the desired set point value for the channel, inasmuch as the presence of the adjusted master resistor 9 has simulated the presence and actual resistance value of the resistor 101 when at the desired set point temperature. Thus the adjusted master resistor 9 has been connected to the detector 105 in comparative relation to the adjustable set point resistor 104 so as to permit the proper and accurate adjustment of the set point contact 113 as determined by the operation of the detector 105.

It should be noted that the operation of the detector 105 in producing its predetermined effect upon detecting the correct position for the contact 113 energizes only the signal lamp 106, but does not cause the actuation of the alarm device 18. This operation takes place because the connection from the output of the detector to the alarm conductor 21 and the device 18 is interrupted by the open condition which the switch contacts 116 and 117 occupy when the switch member 107 occupies the "Master Resistor" position. This feature is provided in the disclosed apparatus to prevent the unwanted and misleading actuation of the alarm device 18 each time that the detector 105, or any of the other detectors of the apparatus, is being used to detect the proper setting or adjustment of the corresponding set point resistor contact.

The normal or monitoring operation of Monitoring Channel No. 1 on the basis of the newly adjusted set point value of 200° F. is achieved by causing the switch members 107 and 110 to occupy the positions shown in the drawing. This reestablishes the normal monitoring bridge circuit within the apparatus, and again places the alarm device 18 under the control of the detector 105, whereafter the latter is operative to actuate the device 18, as well as the lamp 106, whenever the value of the temperature of the element 101 exceeds the selected set point value of 200° F. for which the contact 113 has been accurately adjusted.

Summarizing and generalizing the foregoing operation, when it is desired to set the contact of the set point resistor of a monitoring channel to a position corresponding to a desired set point temperature value for that channel, the element switching means for that channel is moved to the "Master Resistor" position, and the selector switching means for that channel is moved to the "Indicate" position. This establishes a master resistor setting circuit and condition within the apparatus.

Next, the contact 10 of the master resistor 9 is adjusted by means of the knob 11 until the indicator 16 of the measuring means 12 indicates the selected set point temperature value at which the channel is to be set. Thereafter, the selector switching means for the channel is moved to the "Monitor" position to establish a set point setting circuit and condition, and the set point resistor contact for the channel is adjusted until the associated detector just produces its predetermined effect and energizes the corresponding signal lamp. This causes the contact of the set point resistor to be accurately set or positioned in accordance with the selected set point temperature value.

Finally, the element switching means for the channel is returned to the "Element" position to establish the monitoring circuit and condition of the apparatus, whereafter the channel is operative to monitor the temperature and resistance values of the corresponding resistance thermometer element and to cause the actuation of the signalling and alarm devices whenever the actual value of the temperature of the element increases above the selected set point temperature value for which the corresponding set point contact was adjusted.

Although the setting of the set point of only the No. 1 monitoring channel was discussed in detail in the foregoing description, it should be clear that the set point of the No. 2 monitoring channel, or of any of the other channels which may be included in the apparatus, is carried out in exactly the same way and proceeds in exactly the same manner as the operation described above for the No. 1 channel. In each case, the master setting resistor 9 is first adjusted by means of the measuring means 12 to the desired, selected set point temperature value for the particular channel being adjusted, whereafter the adjusted value of the resistor 9 is utilized in properly and accurately setting the individual set point resistor of the particular channel as determined by the operation of the associated detecting means.

It should be apparent from the foregoing that the means for establishing and producing the various set points in the disclosed apparatus, and the means for permitting and facilitating the proper and accurate adjustments of the values of these set points, is of relatively simple form and requires only a relatively uncomplicated switching and interconnecting arrangement. It should also be apparent that no expensive, precision devices are employed for the individual channel set point devices or even for the master setting component, since it is apparent that none of these devices even needs to be calibrated, let alone be a precision device. However, the accurate setting of the monitoring channel set point devices is made possible by the use of the single, accurate measuring means which is already included in the apparatus for permitting the actual temperature values of the resistance thermometer elements to be accurately measured. Thus, the single accurate measuring means 12 provided in the apparatus serves both to permit the accurate measurements of the actual temperature values of the various resistance thermometer elements, and also permits the simple set point devices of the several channels to be accurately adjusted or set in accordance with the desired set point value of temperature for each channel.

Although the particular embodiment of the present invention which has been shown herein by way of example is arranged to monitor the resistance values of a plurality of resistance thermometer elements, and hence to monitor electrically a plurality of temperatures, it is to be understood that the invention is not limited to such electrical resistance or temperature monitoring means. Instead, it should be apparent that the invention is applicable as well to apparatus arranged to monitor one or more different electrical values, such as voltage and frequency, or to monitor other than electrical characteristics or conditions. Further, although the illustrated embodiment of the invention employs a separate detecting means for each monitoring channel, it is to be understood that the invention is applicable as well to monitoring apparatus which employs but a single detecting device and scanning means for sequentially connecting the various channels to be monitored to the single detecting device. Also, it should be apparent that improved monitoring means according to the present invention could be energized with either alternating or direct voltage, depending upon the nature of the particular apparatus.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is as follows:

1. Apparatus including an element having a characteristic the actual value of which is to be compared with a selected value thereof, a set point device adjustable to a value corresponding to said selected value of said characteristic, adjustable master means, measuring means, detecting means operative to produce a predetermined effect upon a departure in a predetermined direction between two values applied in comparative relation thereto, switching means having first, second, and third individually selectable conditions, means connecting said master means to the input of said measuring means through said switching means, when the latter is in said first condition, to permit the adjustment of said master means to a value corresponding to said selected value as measured by said measuring means, means connecting said master means to said set point device and to said detecting means through said switching means, when the latter is in said second condition, to apply to said detecting means any difference between the value of said set point device and the adjusted value of said master means, thereby to permit the adjustment of said set point device to a value corresponding to the adjusted value of said master means, and hence to said selected value, as determined by the operation of said detecting means, and means connecting said element, in lieu of said master means, to said set point device and to said detecting means through said switching means, when the latter is in said third condition, to apply to said detecting means any difference between said actual value and the adjusted value of said set point device, and to cause said detecting means to produce said predetermined effect whenever said actual value differs from said selected value in a predetermined direction.

2. Apparatus including a plurality of elements each having a characteristic the actual value of which is to be compared with a selected value of that characteristic, a separate set point device individually associated with each of said elements and adjustable to a value corresponding to said selected value of the corresponding one of said characteristics, a single adjustable master component, measuring means, detecting means operative to produce a predetermined effect upon a departure in a predetermined direction between two values applied in comparative relation thereto, switching means having first, second, and third individually selectable conditions, means connecting said master component to the input of said measuring means through said switching means, when the latter is in said first condition, to permit the adjustment of said master component to a value corresponding to one of said selected values as measured by said measuring means, means connecting said master component to the corresponding one of said set point devices and to said detecting means through said switching means, when the latter is in said second condition, to apply to said detecting means any difference between the value of the last mentioned set point device and the adjusted value of said master component, thereby to permit the adjustment of said last mentioned set point device to a value corresponding to the adjusted value of said master component, and hence to said one of said selected values, as determined by the operation of said detecting means, and means connecting the corresponding one of said elements, in lieu of said master component, to said last mentioned set point device and to said detecting means through said switching means, when the latter is in said third condition, to apply to said detecting means any difference betwen the corresponding one of said actual values and the adjusted value of said last mentioned set point device, and to cause said detecting means to produce said predetermined effect whenever said corresponding one of said actual values differs from said one of said selected values in a predetermined direction.

3. Apparatus including an element having a characteristic the actual value of which is to be monitored, a set point device adjustable to a value corresponding to a selected value of said characteristic, adjustable master means, measuring means, detecting means operative to produce a predetermined effect upon a departure in a predetermined direction between two values applied in comparative relation thereto, switching means having first, second, third, and fourth individually selectable conditions, means connecting said master means to the input of said measuring means through said switching means, when the latter is in said first condition, to permit the adjustment of said master means to a value corresponding to said selected value as measured by said measuring means, means connecting said master means to said set point device and to said detecting means through said switching means, when the latter is in said second condition, to apply to said detecting means any difference between the value of said set point device and the adjusted value of said master means, thereby to permit the adjustment of said set point device to a value corresponding to the adjusted value of said master means, and hence to said selected value, as determined by the operation of said detecting means, means connecting said element, in lieu of said master means, to said set point device and to said detecting means through said switching means, when the latter is in said third condition, to apply to said detecting means any difference between said actual value and the adjusted value of said set point device, and to cause said detecting means to produce said predetermined effect whenever said actual value differs from said selected value in a predetermined direction, and means connecting solely said element to said input of said measuring means through said switching means, when the latter is in said fourth condition, to obtain a direct measure of said actual value.

4. Apparatus including a plurality of elements each having a characteristic the actual value of which is to be monitored, a separate set point device individually associated with each of said elements and adjustable to a value corresponding to a selected value of the corresponding one of said characteristics, a single adjustable master component, measuring means, detecting means operative to produce a predetermined effect upon a departure in a predetermined direction between two values applied in comparative relation thereto, switching means having first, second, third, and other individually selectable conditions, means connecting said master component to the input of said measuring means through said switching means, when the latter is in said first condition, to permit the adjustment of said master component to a value corresponding to one of said selected values as measured by said measuring means, means connecting said master component to the corresponding one of said set point devices and to said detecting means through said switching means, when the latter is in said second condition, to apply to said detecting means any difference between the value of the last mentioned set point device and the adjusted value of said master component, thereby to permit the adjustment of said last mentioned set point device to a value corresponding to the adjusted value of said master component, and hence to said one of said selected values, as determined by the operation of said detecting means, means connecting the corresponding one of said elements, in lieu of said master component, to said last mentioned set point device and to said detecting means through said switching means, when the latter is in said third condition, to apply to said detecting means any difference between the corresponding one of said actual values and the adjusted value of said last mentioned set point device, and to cause said detecting means to produce said predetermined effect whenever said corresponding one of said actual values differs from said one of said selected values in a predetermined direction, and means connecting solely said corresponding one of said elements to said input of said measuring means through said switching means, when the latter is in a corresponding one of said other conditions, to obtain a direct measure of said corresponding one of said actual values.

5. In apparatus including an element having a characteristic the actual value of which is to be compared with a selected value thereof, a set point device adjustable to a value corresponding to said selected value of said characteristic, and means connecting said element and said device in comparative relation to detecting means operative to produce a predetermined effect whenever said actual value of said characteristic differs from said selected value in a predetermined direction, the improvement comprising means for permitting and facilitating the proper adjustment of said device, including adjustable master means, measuring means, switching means having first and second individually selectable conditions, means connecting said master means to the input of said measuring means through said switching means, when the latter is in said first condition, to permit the adjustment of said master means to a value corresponding to said selected value as measured by said measuring means, and means connecting said master means, in lieu of said element, to said set point device and to said detecting means through said switching means, when the latter is in said second condition, to apply to said detecting means any difference between the value of said set point device and the adjusted value of said master means, thereby to permit the adjustment of said set point device to a value corresponding to the adjusted value of said master means, and hence to said selected value, as determined by the operation of said detecting means.

6. In apparatus including a plurality of elements each having a characteristic the actual value of which is to be compared with a selected value of that characteristic, a separate set point device individually associated with each of said elements and adjustable to a value corresponding to said selected value of the corresponding one of said characteristics, and means connecting each of said elements and the associated one of said devices in comparative relation to detecting means operative to produce a predetermined effect whenever said actual value of any of said characteristics differs from said selected value for that characteristic in a predetermined direction, the improvement comprising means for permitting and facilitating the proper adjustment of said devices, including a single master component adjustable to values corresponding to said selected values, measuring means, switching means having first and second individually selectable conditions, means connecting said master component to the input of said measuring means through said switching means, when the latter is in said first condition, to permit the adjustment of said master component to a value corresponding to one of said selected values as measured by said measuring means, and means connecting said master component, in lieu of the corresponding one of said elements, to the corresponding one of said set point devices and to said detecting means through said switching means, when the latter is in said second condition, to apply to said detecting means any difference between the value of the last mentioned set point device and the adjusted value of said master component, thereby to permit the adjustment of said last mentioned set point device to a value corresponding to the adjusted value of said master component, and hence to said one of said selected values, as determined by the operation of said detecting means.

7. In apparatus including an element having a characteristic the actual value of which is to be monitored, a set point device adjustable to a value corresponding to a selected value of said characteristic, and switching means operative in a first condition to connect said element and said device in comparative relation to detecting means operative to produce a predetermined effect whenever said actual value of said characteristic differs from said selected value in a predetermined direction, said switching means being operative in a second condition to connect solely said element to measuring means for measuring the actual value of said characteristic, the improvement comprising means for permitting and facilitating the proper adjustment of said device, including adjustable master means, means connecting said master means to said measuring means through said switching means, when the latter is in a third condition, to permit the adjustment of said master means to a value corresponding to said selected value as measured by said measuring means, and means connecting said master means, in lieu of said element, to said set point device and to said detecting means through said switching means, when the latter is in a fourth condition, to apply to said detecting means any difference between the value of said set point device and the adjusted value of said master means, thereby to permit the adjustment of said set point device to a value corresponding to the adjusted value of said master means, and hence to said selected value, as determined by the operation of said detecting means.

8. In apparatus including a plurality of elements each having a characteristic the actual value of which is to be monitored, a separate set point device individually associated with each of said elements and adjustable to a value corresponding to a selected value of the corresponding one of said characteristics, and switching means operative to connect each of said elements and the associated one of said devices in comparative relation to detecting means operaitve to produce a predetermined effect whenever said actual value of any of said characteristics differs from said selected value for that characteristic in a predetermined direction, said switching means also being operative to selectively connect solely said elements, one at a time, to measuring means for measuring the actual value of each of said characteristics, the improvement comprising means for permitting and facilitating the proper adjustment of said devices, including a single master component adjustable to values corresponding to said selected values, means connecting said master component to said measuring means through said switching means, when the latter is in a third condition, a permit the adjustment of said master component to a value corresponding to one of said selected values as measured by said measuring means, and means connecting said master component, in lieu of the corresponding one of said elements, to the corresponding one of said set point devices and to said detecting means through said switching means, when the latter is in a fourth condition, to apply to said detecting means any difference between the value of the last mentioned set point device and the adjusted value of said master component, thereby to permit the adjustment of said last mentioned set point device to a value corresponding to the adjusted value of said master component, and hence to said one of said selected values, as determined by the operation of said detecting means.

9. In apparatus including first and second conductors adapted to be connected to a source of energizing voltage, a resistance element, an adjustable set point resistor having resistance means and a contact adjustable therealong, means connecting said element and said resistance means in series between said conductors, detecting means having an input and an output, and means connecting said input between said contact and a third conductor whose potential lies between the potentials of said first and second conductors to cause said detecting means to produce a predetermined effect in said output whenever the value of the resistance between said contact and said first conductor differs by a predetermined amount and in a predeterminad direction from the value of the resistance between said contact and said second conductor, the improvement comprising means for permitting and facilitating the proper adjustment of said contact so as to compare the actual resistance value of said element with a selected value thereof, including an adjustable master resistor, a balancing resistor having resistance means and a contact adjustable therealong, means connecting said master resistor and the resistance means of said balancing resistor in series between said first and second conductors, balancing means connected between said contact of said balancing resistor and said third conductor and operative to adjust the last mentioned contact along the last mentioned resistance means as a measure of the resistance valve of said master resistor, and means operative to connect said master resistor independently of said balancing resistor in series with the resistance means of said set point resistor between said first and second conductors in lieu of said element.

10. In apparatus including first and second conductors adapted to be connected to a source of alternating energizing voltage, a resistance element, an adjustable set point resistor having resistance means and a contact adjustable therealong, means connecting said element and said resistance means in series between said conductors, phase sensitive detecting means having an input and an output, and means connecting said input between said contact and a third conductor whose instantaneous potential lies between the instantaneous potentials of said first and second conductors, said detecting means being operative to produce a predetermined effect in said output whenever the voltage between said contact and said third conductor is of a predetermined phase with respect to a reference voltage, but not to produce said effect whenever said voltage is of the opposite phase, the improvement comprising means for permitting and facilitating the proper adjustment of said contact so as to compare the actual resistance value of said element with a selected value thereof, including an adjustable master resistor, a balancing resistor having resistance means and a contact adjustable therealong, means connecting said master resistor and the resistance means of said balancing resistor in series between said first and second conductors, phase sensitive balancing means connected between the contact of said balancing resistor and said third conductor and operative to adjust the last mentioned contact along the last mentioned resistance means as a measure of the resistance value of said master resistor, and means operative to connect said master resistor independently of said balancing resistor in series with the resistance means of said set point resistor between said first and second conductors in lieu of said element.

11. Apparatus including an electrical resistance element the actual value of whose resistance is to be compared with a selected value thereof, an adjustable set point resistor having a resistance value which is adjustable to a value corresponding to said selected resistance value, an adjustable master resistor, resistance measuring means, means operative to connect said master resistor to said measuring means to permit the adjustment of the resistance of said master resistor to a value corresponding to said selected resistance value as measured by said measuring means, means operative to connect said adjusted master resistor in resistance comparing relation with said set point resistor to the input of detecting means operative to provide a predetermined output effect whenever the adjusted resistance value of said set point resistor differs in a predetermined direction from the adjusted resistance value of said master resistor, thereby to permit the adjustment of said set point resistor to a resistance value corresponding to said selected resistance value as determined by the operation of said detecting means, and means operative to connect said element to the input of said detecting means in lieu of said master resistor and in resistance comparing relation with said adjusted set point resistor to cause said detecting means to produce said predetermined effect whenever said actual value of the resistance of said element differs from said selected resistance value in a predetermined direction.

12. Apparatus including an electrical resistance element the actual value of whose resistance is to be compared with a selected value thereof, an adjustable set point resistor having resistance means and a contact adjustable therealong to a position corresponding to said selected value, a phase sensitive detector having an input and an output and operative to produce a predetermined effect in said output upon the application to said input of an alternating voltage having a predetermined phase with respect to a reference voltage applied to said detector, but not to produce said effect upon the application to said input of a voltage which is 180° out of phase with respect to the first mentioned voltage, first and second conductors adapted to be connected to a source of alternating energizing voltage supplying also said reference voltage to said detector, means connecting said input of said detector between said contact and a third conductor whose instantaneous potential lies between the instantaneous potentials of said first and second conductors, an adjustable master resistor, resistance measuring means, and switching means operative in a first condition to connect said master resistor to said measuring means to permit the adjustment of the resistance of said master resistor to a value corresponding to said selected value as measured by said measuring means, operative in a second condition to connect said adjusted master resistor in series with said resistance means of said set point resistor between said first and second conductors to permit the adjustment of said contact of said set point resistor to a position corresponding to the adjusted resistance value of said master resistor and hence to said selected value as determined by the operation of said detector, and operative in a third condition to connect said element in series with said resistance means of said set point resistor between said first and second conductors in lieu of said master resistor.

13. Apparatus as specified in claim 12, wherein said measuring means includes a balancing resistor having resistance means and a contact adjustable therealong, and includes balancing means connected between the last mentioned contact and said third conductor and operative to adjust said last mentioned contact as required to reduce substantially to zero the voltage difference between said last mentioned contact and said third conductor, and wherein said switching means when in said first condition connects said master resistor in series with said resistance means of said balancing resistor between said first and second conductors.

14. Apparatus including an electrical resistance element the actual value of whose resistance is to be compared with a selected value thereof, an adjustable set point resistor having resistance means and a contact adjustable therealong, a transformer having a primary winding adapted to be energized from a source of alternating voltage and having a secondary winding, a phase sensitive detector having an input connected between said contact and a tap on said secondary winding between the end terminals thereof and having an output, an adjustable master resistor, a balacing resistor having resistance means and a contact adjustable therealong, balancing means connected between the last mentioned contact and said tap and operative to adjust said last mentioned contact as required to reduce substantially to zero the voltage difference between said last mentioned contact and said tap, a first switching means having a movable contact operative to engage one or the other of first and second stationary contacts, a second switching means having a movable contact operative to engage one or the other of first and second stationary contacts, means connecting said element between one of the end terminals of said secondary winding and said first contact of said first switching means, means connecting said master resistor between said one terminal and said second contact of said first switching means, means connecting said two movable contacts together, means connecting said resistance means of said set point resistor between said first contact of said second switching means and the other of the end terminals of said secondary winding, and means connecting said resistance means of said balancing resistor between said other terminal and said second contact of said second switching means.

15. Apparatus as specified in claim 14, wherein said output of said detector is connected to signalling means and to alarm means for actuation thereof whenever a voltage of one phase, but not the opposite phase, is applied to said input, and wherein said apparatus includes a switch included in the connection between said output and said alarm means and operative to interrupt the last mentioned connection whenever said movable contact and said first contact of said first switching means are out of engagement with each other.

References Cited in the file of this patent

UNITED STATES PATENTS

| | | |
|---|---|---|
| 2,565,501 | Ingram | Aug. 28, 1951 |
| 2,718,145 | Nisle | Sept. 20, 1955 |
| 2,755,436 | Heinz | July 17, 1956 |